Figure 1:
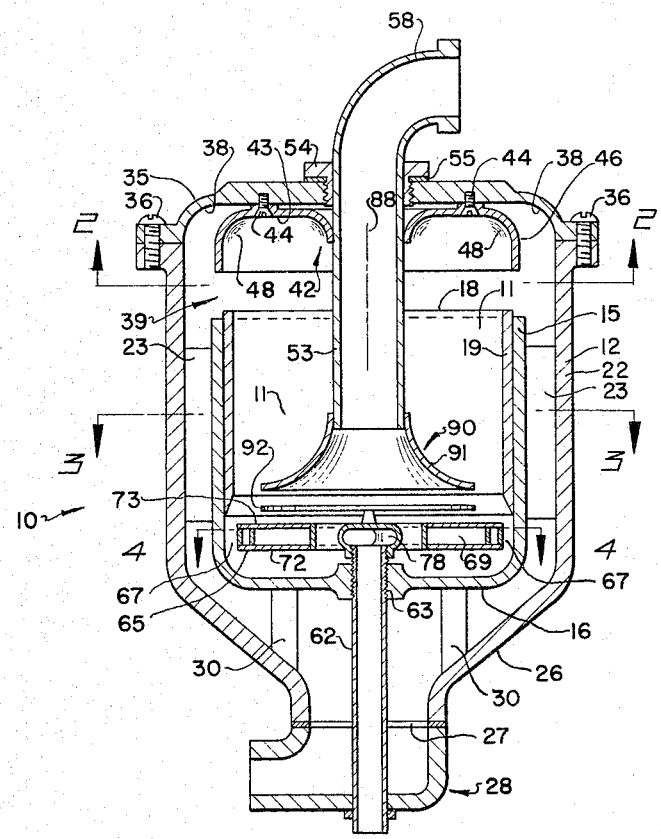

Oct. 4, 1966 G. E. NEUMAN 3,276,592
SEPARATING APPARATUS FOR FLUIDS
Filed July 16, 1963 4 Sheets-Sheet 1

INVENTOR.
GEORGE E. NEUMAN
BY
Featherstonhaugh & Co.
ATTORNEYS

Oct. 4, 1966    G. E. NEUMAN    3,276,592
SEPARATING APPARATUS FOR FLUIDS
Filed July 16, 1963    4 Sheets-Sheet 2
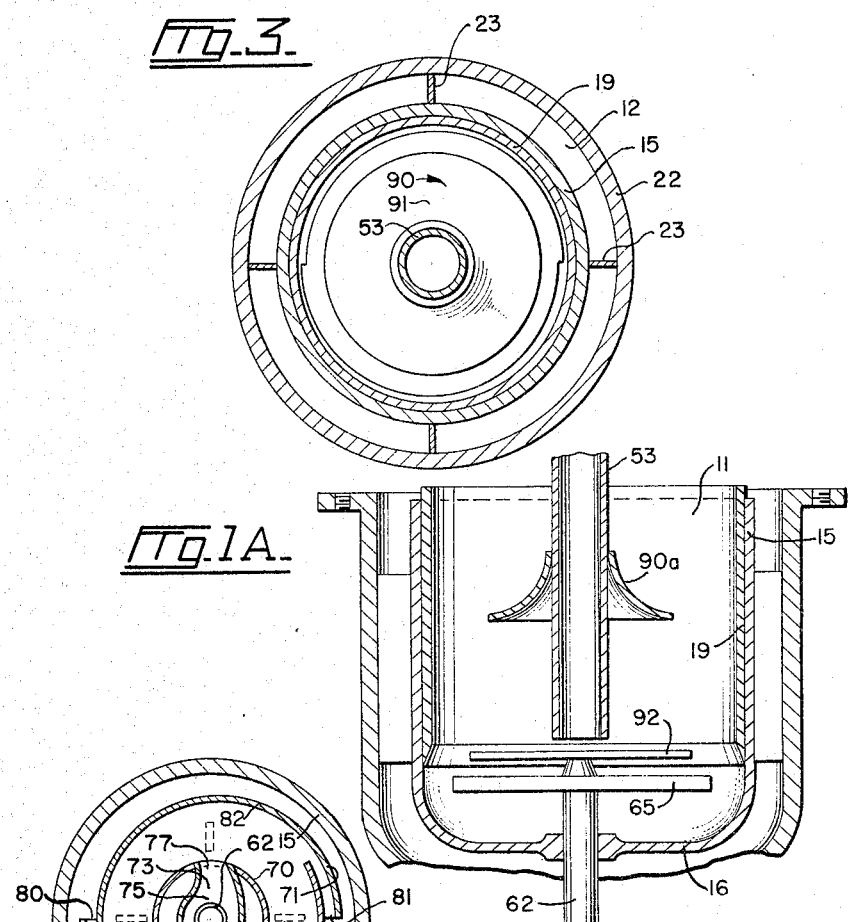
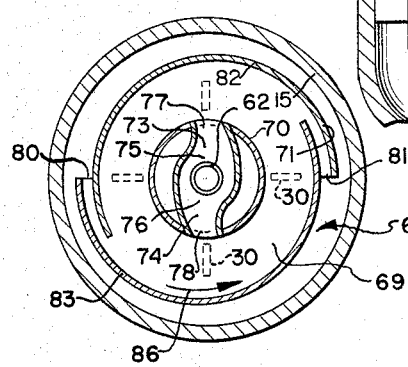
INVENTOR.
GEORGE E. NEUMAN
BY
*Fetherstonhaugh & Co.*
ATTORNEYS

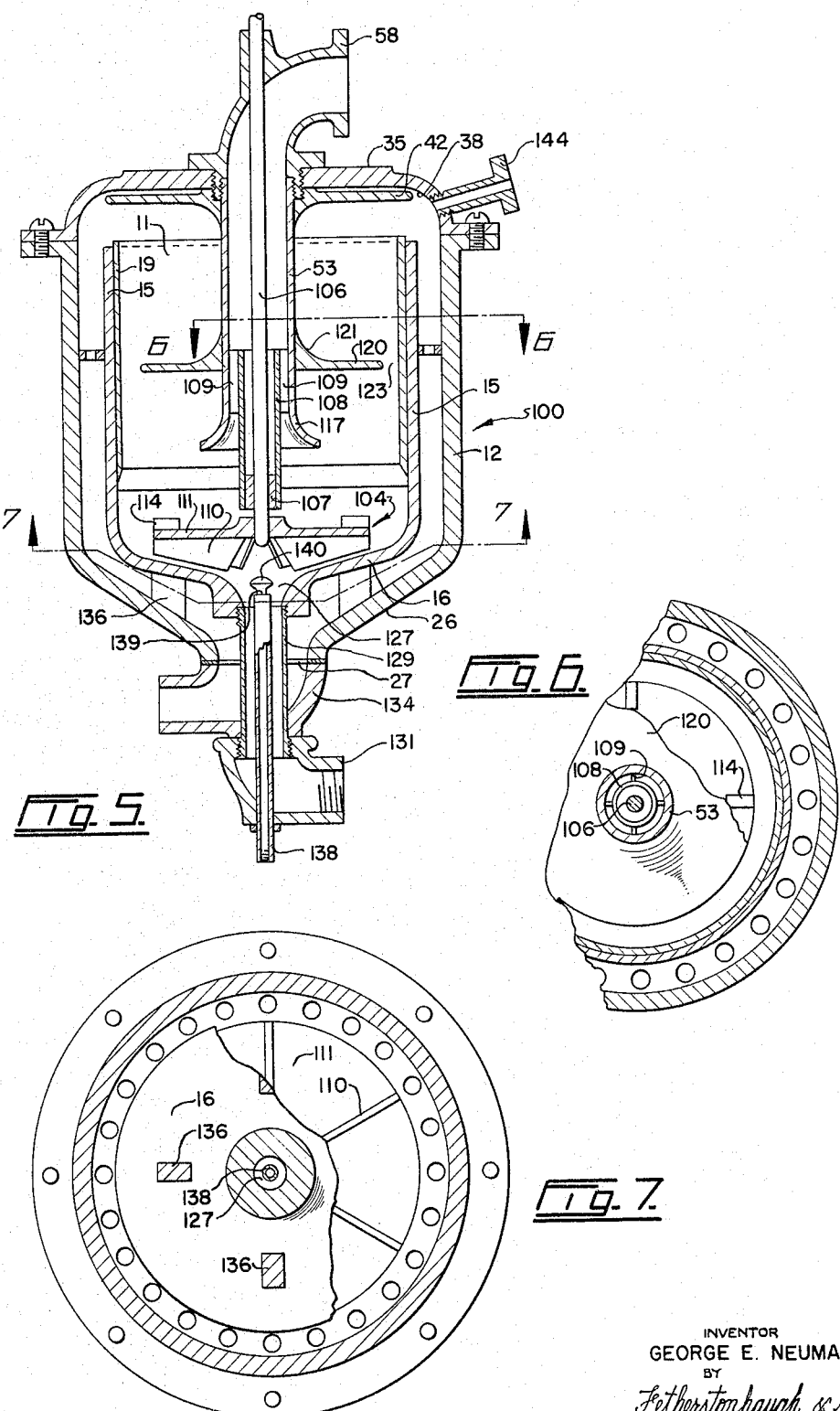

Oct. 4, 1966   G. E. NEUMAN   3,276,592
SEPARATING APPARATUS FOR FLUIDS
Filed July 16, 1963   4 Sheets-Sheet 4

INVENTOR
GEORGE E. NEUMAN
BY
Fetherstonhaugh & Co.
ATTORNEYS

United States Patent Office 3,276,592
Patented Oct. 4, 1966

3,276,592
SEPARATING APPARATUS FOR FLUIDS
George E. Neuman, 5640 Nelson St., South Burnaby, British Columbia, Canada
Filed July 16, 1963, Ser. No. 295,495
13 Claims. (Cl. 210—319)

This invention relates to separating apparatus for fluids, including both liquids and gases.

This invention relates to improved apparatus for separating from a fluid impurities of a higher specific gravity than that of the fluid, such as, for example, separating solids from liquids or gases, and separating liquids of different specific gravities.

Another object is the provision of apparatus for continuously or intermittently separating from a fluid impurities of higher specific gravities.

A further object is the provision of a separator for fluids which does not include any obstructions therein to the flow of fluid therethrough.

Yet another object is the provision of apparatus for separating relatively heavy particles from a fluid which has been made denser than normal by comparatively light particles such as, for example, separating sand and dirt from wood pulp.

With these and other objects in view, the present invention relates to apparatus for separating from a fluid impurities of a higher specific gravity than that of the fluid, which comprises a separating chamber having a substantially cylindrical wall, an end wall secured to one end of the cylindrical wall closing one end of the chamber, an opening at the opposite end of the cylindrical wall and chamber to allow fluid to flow from the chamber adjacent said cylindrical wall, inlet means for delivering fluid with impurities therein through said end wall to the chamber, means near the chamber end wall for imparting to the fluid being delivered a rotary motion within the chamber around a central axis thereof to cause said fluid to spiral away from the end wall and near and along the cylindrical wall, the rotation of the fluid in the chamber causing the heavy impurities under centrifugal force to move away from said chamber axis to the cylindrical wall and along the latter to and out through the opening at the opposite end of the cylindrical wall, said centrifugal force causing the heavy impurities to move outwardly relative to said upper end of the cylindrical wall as the impurities pass through said opening, and outlet means in the chamber near the rotary motion imparting means for removing fluid from the chamber near said central axis thereof, whereby fluid after moving along the cylindrical wall flows back centrally of the chamber to said outlet means.

Figure 2:
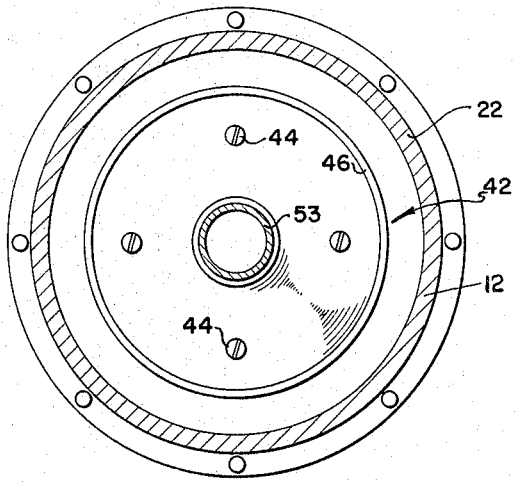
Figure 9:
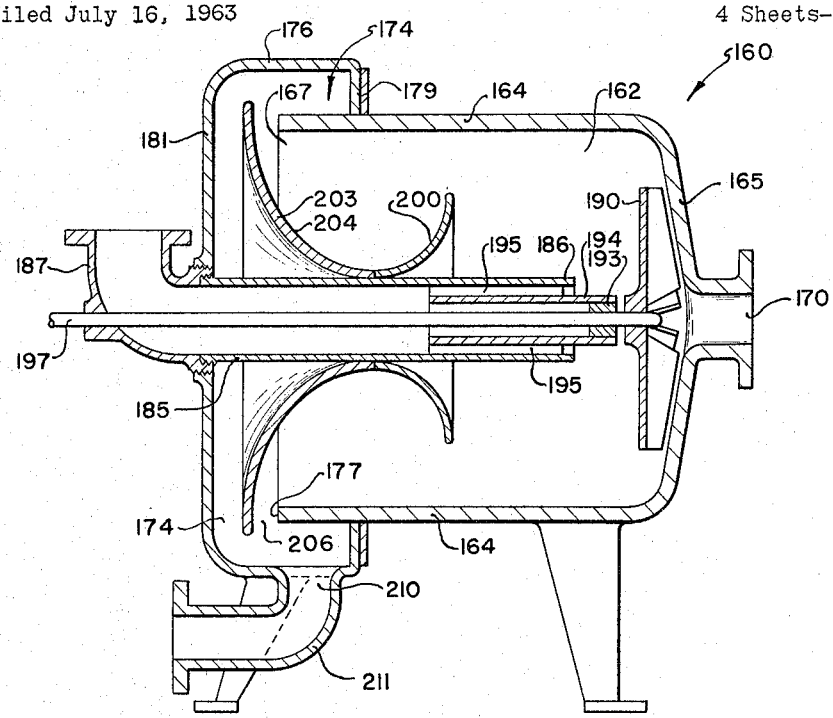
Figure 8:
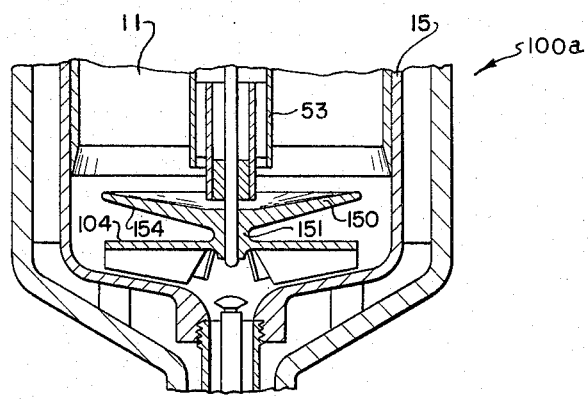

Several modifications of this invention are illustrated by way of example in the accompanying drawings, in which, FIGURE 1 is a vertical section through one form of separator, FIGURE 1A is a fragmentary, sectional view showing a separator slightly different from that of FIGURE 1, FIGURE 2 is a horizontal section taken on the line 2—2 of FIGURE 1, FIGURE 3 is a horizontal section taken on the line 3—3 of FIGURE 1, FIGURE 4 is another horizontal section taken on the line 4—4 of FIGURE 1, FIGURE 5 is a vertical section through an alternative form of separator, FIGURE 6 is a fragmentary horizontal section taken on the line 6—6 of FIGURE 5, FIGURE 7 is a horizontal section taken substantially on the line 7—7 of FIGURE 5, FIGURE 8 is a fragmentary vertical section through the lower portion of another alternative separator which is similar to that of FIGURE 5, and FIGURE 9 is a longitudinal section through still another alternative form of separator.

Referring to FIGURES 1 to 4 of the drawings, 10 is a separator including a separating chamber 11 mounted within an outer catching or settling tank 12. Chamber 11 consists of a substantially cylindrical wall 15 and a bottom 16 at the lower end of said wall. This chamber is usually completely open at its upper end at 18, although it may have a cover thereon with one or more outlet openings located at the upper edge of wall 15. If desired, a sleeve 19 may slidably fit within wall 15 for adjusting the effective height of said wall.

Chamber 11 is preferably mounted within tank 12 spaced from and substantially concentric with wall 22 thereof. It is desirable to provide a plurality of spaced vertical baffles 23 between walls 15 and 22. These baffles may be secured to the walls in any convenient manner, such as by welding, so that they help support chamber 11 within the settling tank. Tank 12 is provided with a conical bottom 26 having an outlet 27 therein centrally thereof. An elbow 28 is provided for outlet 27. A plurality of spaced baffles 30 extend between bottoms 16 and 26 to help support chamber 11 in the tank.

The upper end of tank 12 is closed by a cover 35 removably held thereon by bolts 36. This cover is internally coved at 38, said cove being located over the top of the annular space 39 between chamber and tank walls 15 and 22. If desired, a hood 42 may be provided over but spaced from the upper end of tank wall 15, as shown in FIGURE 1. This hood may be used with or in place of cove 38. Hood 42 has a top 43 secured to the inner surface of cover 35 by bolts 44, and a depending annular wall 46 which is substantially aligned with wall 15. Hood 42 is preferably internally coved at 48.

An outlet pipe 53 extends through cover 35 and hood 42 centrally thereof. This pipe extends through a large nut 54 threaded into the cover, said nut being adapted to be tightened down against a gasket 55 to provide a seal around the opening in the cover. Pipe 53, which forms an outlet for chamber 11, is provided with an elbow 58 at its upper end.

An inlet pipe 62 extends upwardly through a wall of elbow 28, through outlet 27, and through bottom 16 of chamber 11. The inlet pipe extends freely through outlet 27, and through a fluid-tight joint 63 in chamber bottom 16. A fluid impeller 65 is fixedly mounted on the upper end of pipe 62 adjacent chamber bottom 16 and extends outwardly almost to chamber wall 15, but is spaced laterally from the latter to form an annular passage 67 therebetween.

Impeller 65 comprises an annular chamber 69 having spaced substantially concentric inner and outer walls 70 and 71, a bottom 72 and a top 73. Means is provided for directing fluid from inlet pipe 62 into chamber 69 in such a way as to cause said fluid to flow around the chamber. The upper end of pipe 62 communicates with one of more curved and radiating pipes or passages which extend to chamber 69. In this example, there are two of these curved rediating passages 73 and 74. Passages 73 and 74 have inlets 75 and 76 at their inner ends communicating with pipe 62, see FIGURE 4, and outlets 77 and 78, respectively, opening into chamber 69, preferably in diametrically opposite directions. This chamber is also provided with one or more openings in the peripheral wall 71 thereof through which fluid and impurities are tangentially discharged into chamber 11. In this example, two openings 80 and 81 are provided for this purpose, said openings preferably being spaced from outlets 77 and 78. It will be noted that peripheral wall 71 is formed in substantially semi-circular sections 82 and 83 which are offset relative to each other in order to provide openings 80 and 81 between the adjacent ends thereof. Wall section 82 forms a baffle near and leading towards opening 80, while section 83 forms a baffle near and leading to opening 81.

Fluid pumped into the apparatus through pipe 62 is directed into annular chamber 69 through passages 73 and 74 in such a manner as to cause the fluid to flow along a circular path indicated by arrow 86 in FIGURE 4. Centrifugal force sends the fluid and the impurities therein to the outer annular wall 71 so that they are directed out of the chamber through openings 80 and 81 into separating chamber 11. As the fluid with its impurities is discharged into the separating chamber tangentially from impeller 65, the liquid and impurities swirl around the vertical axis 88 of the separating chamber. The fluid has a tendency to rise in chamber 11 and it overflows from said chamber into tank 12. Centrifugal force causes the impurities of higher specific gravity than the fluid to move outwardly against wall 15, said sleeve 19, if used, actually forming part of this wall. The impurities as they swirl around the separating chamber wall move up the latter to and out through the open upper end of the separating chamber. Any lighter impurities that are carried upwardly by the fluid flow into hood 42. As the upward velocity of the fluid is checked within this hood, these impurities tend to drop downwardly and are eventually washed laterally by the flow of liquid into tank 12. A deflector funnel 90 is mounted on the lower end of pipe 53 and forms an entrance therefor just above impeller 65. The upper surface 91 of this funnel curves downwardly and outwardly towards wall 15, but terminates short of said wall. This deflector funnel directs descending fluid in the chamber towards wall 15 thereof so that any impurities remaining in it are caught in the fluid stream spiralling up the wall. The lighter fluid flows around the periphery of funnel 90 and up into outlet pipe 53. If desired, deflector 90 may be spaced upwardly a little from the lower end of pipe 53, see deflector 90a in FIGURE 1A.

It is desirable to place a baffle 92 between impeller 65 and the inlet or lower end of pipe 53. This helps to prevent fluid at the bottom of chamber 11 from travelling directly to the outlet pipe.

The comparatively heavy impurities flow over the upper edge of wall 15 into settling tank 12. As the velocity of the fluid drops sharply in the settling tank, the comparatively heavy impurities drop downwardly therein. Baffles 23 check any rotary motion of the fluid in the settling tank so that the impurities drop comparatively rapidly downwardly in said tank, and are removed continuously or periodically therefrom through outlet 27 and elbow 28.

During operation of separator 10, fluid rotates at high speed around the vertical axis 88 within chamber 11 causing impurities to move up wall 15 and out through the opening at the top of said chamber. The effective height of wall 15 may be adjusted to suit the impurities being separated by means of sleeve 19. Tank 12 holds a comparatively quiet pond of the fluid so that the impurities rapidly settle therein, after which they are not affected by the movement of fluid through the apparatus. It is obvious that the fluid moves continuously into the apparatus through pipe 62 and out through pipe 53, and as there is very little opposition to the natural movement of the fluid, it can be maintained at a desired speed if the apparatus is connected into a closed circulating system. If some loss of fluid is not objectionable, settling tank 12 may be omitted. In this case, the impurities are discharged over the top of the separating wall and out of the apparatus.

FIGURES 5 to 7 illustrate an alternative separator 100. It is similar to separator 10, the main difference being in the means for imparting a rotary motion to the fluid in separating chamber 11.

In place of impeller 65, there is a rotatable impeller 104 located just above the bottom 16 of chamber 11. The impeller is fixedly mounted on the lower end of a shaft 106 extending upwardly through outlet pipe 53 and out through the wall of elbow 58 at the upper end of said pipe. The lower end of shaft 106 extends through a bearing 107 carried by a sleeve 108 extending below the lower end of pipe 53 and supported in said pipe by spaced webs 109. Shaft 106 is rotated by a suitable source of power, such as an electric motor, not shown.

The impeller 104 consists of a plurality of blades 110 radiating from a central hub and secured to the undersurface of a baffle or disc 111. If desired, the disc may be omitted. Furthermore, a plurality of short radiating vanes 114 may be mounted on the upper surface of disc 111 adjacent the periphery thereof.

It is preferable to terminate outlet pipe 53 a little above impeller 104. Funnel 90 has been omitted, but the lower end of pipe 53 is preferably flared outwardly a little, as indicated at 117, to form an entrance funnel. A deflector baffle 120 surrounds and is preferably mounted on outlet pipe 53 at a point spaced above the entrance of said pipe, as clearly shown in FIGURE 5. The deflector baffle radiates from the outlet pipe and preferably has a downwardly and outwardly curved upper surface 121. Baffle 120 extends towards but terminates short of the wall of chamber 11 to leave an annular passage 123 therebetween.

Bottom 16 of the separating chamber is formed with an inlet opening 127 therein. An inlet pipe 129 is secured to said bottom 16 and communicates at its upper end with inlet opening 127. Pipe 129 extends freely through tank bottom outlet 27 and has an elbow 131 connected to its lower end. With this arrangement, liquid containing impurities is directed by pipe 129 through inlet opening 127 into the bottom of separating chamber 11. An elbow 134 communicating with outlet 27 is connected to tank bottom 26. A plurality of spaced baffles 136 extend between chamber bottom 16 and tank bottom 26 to support chamber 11 in tank 12.

Separator 100 operates generally in the same manner as separator 10. The fluid containing impurities is directed into separating chamber 11 near the lower end thereof by pipe 129. Impeller 104 is rotated at a suitable speed through shaft 106, and the blades of this impeller impart a rotary motion to the entering fluid which causes the heavy impurities to move outwardly to wall 15 of the chamber, and upwardly along said wall to spill out of the top of the chamber over the upper edge of said wall. These impurities settle to the bottom of tank 12 and flow out therefrom through outlet 27 and elbow 134. The fluid after travelling along wall 15 is directed back downwardly in chamber 11 near the vertical axis of said chamber. Deflector 120 directs this downwardly-moving fluid outwardly towards the chamber wall where any impurities remaining in the fluid are picked up by the faster moving fluid along the wall and moved upwardly again. The clean fluid moves around the outer edge of baffle 120 and eventually travels up outlet pipe 53 and out of the apparatus.

Impeller 104 acts as a barrier between inlet pipe 129 and outlet pipe 53 so that all fluid entering the separating chamber is directed outwardly to the wall thereof and cannot travel directly to the outlet pipe. Deflector baffle 120 continuously deflects downwardly-moving fluid towards the chamber wall so that any impurities still remaining in said downwardly-moving fluid are picked up and moved upwardly to the chamber top. Thus, any impurities which do not flow out of the separating chamber the first time around keep circulating in the upper section of said chamber until they eventually pass out of the chamber. Baffle 120 also prevents the rotating fluid from moving upwardly in the separating chamber at any place other than along the wall thereof. In other words, it prevents the fluid from travelling comparatively straight up in the separating chamber and thereby ensures a maximum number of spiral revolutions of the fluid in the chamber before it reaches the top thereof. This, in turn, causes all the heavy impurities to be directed to the chamber wall before they reach the top of said chamber.

Vanes 114 of separator 100 direct fluid outwardly towards chamber wall 15 as impeller 104 rotates to prevent fluid which has entered the bottom of the chamber from travelling directly towards the inner end of outlet pipe 53.

Separator 100 is particularly useful for separating particles from gas. For example, it may be used to separate out a large percentage of the solids of smoke. This is helped by spraying water into the smoke as it enters separating chamber 11. For this purpose, a small pipe 138 extends longitudinally through inlet pipe 129 and opens at 139 into the bottom area of the separating chamber just below impeller 104. If desired, a baffle 140 may be provided for imparting a lateral component to water emerging from pipe 138. Thus, this pipe 138 is adapted to spray water into the bottom of the separating chamber.

Smoke is directed through pipe 129 into the bottom of chamber 11, where it comes into contact with the water spray from pipe 138. The water and a large percentage of the solids of the smoke are directed under the action of centrifugal force to the wall of the chamber and travel upwardly in a spiral along said wall and out over the top thereof into settling tank 12. The water spiralling up the inner wall of the chamber carries soot and smoke tars with it and out into the tank. The water and solids are continuously or periodically removed from the bottom of the tank through elbow 134.

It will be noted that the annular wall 46 of hood 42 has been omitted, and that the wall 15 of chamber 11 has been carried up to a level near said hood. However, if desired, wall 15 may be made shorter, and the hood provided with annular wall 46.

If pipe 138 is omitted, shaft 106 may extend downwardly through inlet pipe 129 instead of through pipe 53, in which case it would be connected to the underside of impeller 104.

If desired, tank 12 may be provided with an inlet opening 144 at the top thereof. In this example, the opening is provided in cover 35 at cove 38 thereof so that it is directed angularly towards the open top of chamber 11. In this case, wall 46 is omitted from hood 42. Inlet opening 144 may be used when heavy particles are to be separated from lighter particles in a liquid, such as, for example, when wood pulp containing sand is run through the separator. In this case, the liquid and pulp constitute a dense liquid from which the sand is to be separated. Water is injected through opening 144 to help keep most of the pulp from passing over into the settling tank.

FIGURE 8 illustrates an alternative separator 100a which is slightly different from separator 100. In separator 100a, vanes 114 have been omitted from impeller 104, and in place thereof, a concave baffle 150 is provided. This baffle is connected to the upper surface of the impeller at 151 so that it rotates therewith. The baffle extends between the impeller and the inner end of outlet pipe 53 so that fluid cannot travel around the outer edge of the impeller directly to said outlet pipe. Baffle 150 has an undersurface 154 which extends outwardly and upwardly from the centre of the impeller towards chamber wall 15, but is spaced from said wall.

While baffle 150 prevents liquid with impurities therein from travelling directly from the bottom of separating chamber 11 to outlet pipe 53, it also prevents clean liquid travelling downwardly around the vertical axis of the separating chamber from being directed back out towards chamber wall 15. Any heavy impurities reaching baffle 150 are thrown outwardly by centrifugal force to wall 15.

FIGURE 9 illustrates yet another form of separator 160. This separator includes a separating chamber 162 having a horizontal cylindrical wall 164 which is closed at one end by an end wall 165. The opposite end of cylindrical wall 164 is provided with an opening 167. Fluid with impurities therein is directed into chamber 162 through an inlet opening 170 formed in end wall 165 centrally thereof.

A catching tank 174 surrounds and is spaced from the open end of cylindrical wall 164 of the separating chamber. This tank consists of a cylindrical wall 176 spaced outwardly from cylindrical wall 164 and partially overlapping end 177 thereof. An annular wall 179 extends between walls 164 and 176 to close one end of tank 174, and another wall 181 closes the opposite end of said tank, wall 181 being spaced away from the open end 177 of the separating chamber.

An outlet pipe 185 extends through tank wall 181 and along the central axis of chamber 162, said pipe having an inner end 186 spaced inwardly from chamber end wall 165. An elbow 187 is connected to the outer end of pipe 185.

An impeller 190 similar to impeller 104 is mounted on a shaft 197 which extends longitudinally through outlet pipe 185 and out through the wall of the latter at its outer end. This shaft is rotated by a suitable source of power, such as electric motor, not shown. The inner end of shaft 197 is supported by a bearing 193 carried by sleeve 194 supported in pipe 185 by a plurality of spaced webs 195. If desired, shaft 197 may be supported by a suitable bearing adjacent inlet 170 and extend through said inlet to be connected to the outer side of impeller 190.

A conical deflector baffle 200 is secured to the outer surface of pipe 185 opening towards and spaced from the inner end 186 of said pipe. Another baffle 203 in the form of an inverted cone is secured to the outlet pipe near and extends away from baffle 200. This baffle 203 has a surface 204 which curves outwardly from pipe 185 and extends through opening 167 of chamber 162 and overlaps the end 177 of wall 164, said baffle being spaced from wall end 177 to form an annular passage 206 therebetween.

Tank 174 is provided with an outlet 210 in annular wall 176 opposite chamber wall 164 and at the bottom of the apparatus. An elbow 211 is connected to outlet 210.

Separator 160 operates in substantially the same manner as the other separators. Fluid containing impurities is directed into separating chamber 162 through inlet opening 170 thereof which is located centrally of end wall 165. Rotating impeller 190 directs this fluid outwardly to cylindrical wall 164 of the chamber end spirally along said wall. The portion of baffle 203 overlying the end of chamber wall 164 helps to direct the heavy impurities which move along said wall outwardly into tank 174. The central portion of said baffle directs the lighter fluid back towards the end 165 of the separating chamber. The outer surface of conical baffle 200 directs any impurities in this fluid back toward wall 164 to join the main stream of materials travelling along said wall. The clean fluid travels around the periphery of baffle 200 and flows out of the apparatus through pipe 185. The impurities directed into tank 174 move downwardly therein and flow out through outlet 210.

What I claim as my invention is:

1. Apparatus for separating from a fluid impurities of a higher specific gravity than that of the fluid, comprising a separating chamber having a substantially cylindrical wall, an end wall secured to one end of the cylindrical wall closing one end of the chamber, an opening at the opposite end of the cylindrical wall and chamber to allow fluid to flow from the chamber adjacent said cylindrical wall, a tank enclosing at least said opposite end of the cylindrical wall and spaced from the latter wall to receive fluid moving out of the chamber through said opening, inlet means for delivering fluid with impurities therein through said end wall to the chamber, means near the chamber end wall for imparting to the fluid being delivered a rotary motion within the chamber around a central axis thereof to cause said fluid to spiral away from the end wall and near and along the cylindrical wall, the rotation of the fluid in the chamber causing the heavy impurities under centrifugal force to move away from said chamber axis to the cylindrical wall and along the latter to and out through the opening at the opposite end of the cylindrical wall, said centrifugal force also causing the heavy impurities to move outwardly relative to said opposite end of the cylindrical wall into the tank as the impurities pass through said opening, an outlet pipe in and extending longitudinally of the chamber and out through the tank and having an open end near but spaced from the rotary motion imparting means for removing fluid from the chamber near said central axis thereof, whereby fluid after moving along the cylindrical wall flows back centrally of the chamber to said open end of the outlet pipe, baffle means extending entirely across the outlet pipe open end and spaced from the outlet pipe open end between the latter and said inlet means and said rotary motion imparting means, and means for removing impurities from the tank.

2. Separating apparatus as claimed in claim 1 including return means in the tank adjacent said opposite end of the cylindrical wall and chamber for directing fluid back through the chamber centrally thereof towards said open end of the outlet pipe.

3. Separating apparatus as claimed in claim 2 including deflector means on and radiating from the outlet pipe in the separating chamber substantially midway between the rotary motion imparting means and the return means for directing any impurities in the fluid moving back through the chamber outwardly towards the cylindrical wall to be picked up by fluid moving along said cylindrical wall.

4. Apparatus for separating from a fluid impurities of a higher specific gravity than that of the fluid, comprising a closed outer tank, a separating chamber mounted in the tank centrally thereof and having a substantially cylindrical wall and a closed bottom at a lower end of said wall, an opening at the opposite end of the cylindrical wall and chamber to allow fluid to flow from the chamber adjacent said cylindrical wall, said tank having a bottom adjacent the chamber bottom with an outlet opening therein, an inlet pipe extending freely through the outlet opening in the tank bottom and extending into the separating chamber for delivering fluid with impurities therein to said chamber, impeller means in the chamber near the bottom thereof for receiving said fluid and for imparting to the fluid a rotary motion within the chamber around a central axis thereof to cause said fluid to spiral away from the chamber bottom and near and along the cylindrical wall, the rotation of the fluid in the chamber causing the heavy impurities under centrifugal force to move away from said chamber axis to the cylindrical wall and along the latter to and out through the opening at the opposite end of the cylindrical wall, said centrifugal force also causing the heavy impurities to move outwardly relative to said opposite end of the cylindrical wall into the tank as the impurities pass through said opening, an outlet pipe in and extending longitudinally of the chamber and out through the tank and having an open end near but spaced from the rotary motion imparting means for removing fluid from the chamber near said central axis thereof, whereby fluid after moving along the cylindrical wall flows back centrally of the chamber to said open end of the outlet pipe, a deflector baffle on and radiating from the outlet pipe and spaced upwardly from the open end thereof but spaced below the opposite end of the cylindrical wall, and means for removing impurities from the tank.

5. Apparatus for separating from a fluid impurities of a higher specific gravity than that of the fluid, comprising a closed outer tank, a separating chamber mounted in the tank centrally thereof and having a substantially cylindrical wall and a closed bottom at a lower end of said wall, an opening at the opposite end of the cylindrical wall and chamber to allow fluid to flow from the chamber adjacent said cylindrical wall, said tank having a bottom adjacent the chamber bottom with an outlet opening therein, an inlet pipe extending freely through the outlet opening in the tank bottom and extending into the separating chamber for delivering fluid with impurities therein to said chamber, an impeller mounted for rotation in the separating chamber near the bottom thereof, said impeller having blades for imparting to fluid from the inlet pipe a rotary motion within the chamber around a central axis thereof to cause said fluid to spiral away from the chamber bottom and near and along the cylindrical wall, the rotation of the fluid in the chamber causing the heavy impurities under centrifugal force to move away from said chamber axis to the cylindrical wall and along the latter to and out through the opening at the opposite end of the cylindrical wall, said centrifugal force also causing the heavy impurities to move outwardly relative to said opposite end of the cylindrical wall into the tank as the impurities pass through said opening, an outlet pipe in and extending longitudinally of the chamber and out through the tank and having an open end near but spaced from the rotary motion imparting impeller for removing fluid from the chamber near said central axis thereof, whereby fluid after moving along the cylindrical wall flows back centrally of the chamber to said open end of the outlet pipe, a deflector baffle on and radiating from the outlet pipe and spaced upwardly from the open end thereof but spaced below the opposite end of the cylindrical wall, and means for removing impurities from the tank.

6. Separating apparatus as claimed in claim 5 including an inlet opening in the tank near and above said opposite end of the cylindrical wall.

7. Separating apparatus as claimed in claim 5 including a second pipe extending into the separating chamber at the bottom thereof for directing water into the chamber, and spray means on said second pipe for directing water from the second pipe in a spray into fluid entering the chamber through the inlet pipe.

8. Separating apparatus as claimed in claim 5 including baffle means in the separating chamber between the open end of the outlet pipe and the impeller, said baffle means preventing fluid from flowing directly from the impeller to said open end of the outlet pipe.

9. Separating apparatus as claimed in claim 8 in which the baffle means is cup-shaped and is mounted to rotate with the impeller.

10. Apparatus for separating from a fluid impurities of a higher specific gravity than that of the fluid, comprising a separating chamber having a horizontal substantially cylindrical wall, an end wall secured to one end of the cylindrical wall closing one end of the chamber, an inlet opening in said end wall through which fluid with impurities therein is delivered to the chamber, an opening at the opposite end of the cylindrical wall and chamber to allow fluid to flow from the chamber adjacent said cylindrical wall, a tank enclosing said opposite end of the cylindrical wall and spaced from the latter wall to receive fluid moving out of the chamber through said opening in the opposite end of the cylindrical wall, an impeller mounted for rotation in the chamber near said end wall for imparting to the fluid being delivered a rotary motion within the chamber around a central axis thereof to cause said fluid to spiral away from the end wall and near and along the cylindrical wall, the rotation of the fluid in the chamber causing the heavy impurities under centrifugal force to move away from said chamber axis to the cylindrical wall and along the latter to and out through the opening at the opposite end of the cylindrical wall, said centrifugal force also causing the heavy impurities to move outwardly relative to said opposite end of the cylindrical wall into the tank as the impurities pass through said opening in the opposite end of the cylindrical wall, an outlet pipe extending through the tank and centrally through the chamber, said outlet pipe having an inlet end near the impeller, whereby fluid after moving along the cylindrical wall flows back centrally of the chamber to said inlet end and out through the outlet pipe, a deflector mounted on the outlet pipe in the separating chamber and spaced from the inlet end of said pipe toward the opposite end of the cylindrical wall for directing impurities in the fluid moving back through the chamber outwardly towards the cylindrical wall to be picked up by fluid moving along said cylindrical wall and means for removing impurities from the tank below the separating chamber.

11. Separating apparatus as claimed in claim 10 including a baffle mounted on the outlet pipe radiating outwardly therefrom and extending through the opening at said opposite end of the cylindrical wall to direct fluid from said cylindrical wall back towards the inlet end of the outlet pipe.

12. Apparatus for separating from a fluid impurities of a higher specific gravity than that of the fluid, comprising a closed outer tank, a separating chamber mounted in the tank centrally thereof and having a substantially cylindrical wall and a closed bottom at a lower end of said wall, an opening at the opposite end of the cylindrical wall and chamber to allow fluid to flow from the chamber adjacent said cylindrical wall, said tank having a bottom adjacent the chamber bottom with an outlet opening therein, an inlet pipe extending freely through the outlet opening in the tank bottom and extending into the separating chamber for delivering fluid with impurities therein to said chamber, an impeller mounted for rotation in the separating chamber near the bottom thereof, said impeller having blades for imparting to fluid from the inlet pipe a rotary motion within the chamber around a central axis thereof to cause said fluid to spiral away from the chamber bottom and near and along the cylindrical wall, the rotation of the fluid in the chamber causing the heavy impurities under centrifugal force to move away from said chamber axis to the cylindrical wall and along the latter to and out through the opening at the opposite end of the cylindrical wall, said centrifugal force also causing the heavy impurities to move outwardly relative to said opposite end of the cylindrical wall into the tank as the impurities pass through said opening in the opposite end of the cylindrical wall, outlet means in the chamber near the rotary motion imparting impeller for removing fluid from the chamber near said central axis thereof, whereby fluid after moving along the cylindrical wall flows back centrally of the chamber to said outlet means, means for removing impurities from the tank, a second pipe extending into the separating chamber at the bottom thereof for directing water into the chamber, and spray means on said second pipe for directing water from the second pipe in a spray into fluid entering the chamber through the inlet pipe.

13. Apparatus for separating from a fluid impurities of a higher specific gravity than that of the fluid, comprising a closed outer tank, a separating chamber mounted in the tank centrally thereof and having a substantially cylindrical wall and a closed bottom at a lower end of said wall, an opening at the opposite end of the cylindrical wall and chamber to allow fluid to flow from the chamber adjacent said cylindrical wall, said tank having a bottom adjacent the chamber bottom with an outlet opening therein, an inlet pipe extending freely through the outlet opening in the tank bottom and extending into the separating chamber for delivering fluid with impurities therein to said chamber, an impeller mounted for rotation in the separating chamber near the bottom thereof, said impeller having blades for imparting to fluid from the inlet pipe a rotary motion within the chamber around a central axis thereof to cause said fluid to spiral away from the chamber bottom and near and along the cylindrical wall, the rotation of the fluid in the chamber causing the heavy impurities under centrifugal force to move away from said chamber axis to the cylindrical wall and along the latter to and out through the opening at the opposite end of the cylindrical wall, said centrifugal force also causing the heavy impurities to move outwardly relative to said opposite end of the cylindrical wall into the tank as the impurities pass through said opening in the opposite end of the cylindrical wall, outlet means in the chamber near the rotary motion imparting impeller for removing fluid from the chamber near said central axis thereof, whereby fluid after moving along the cylindrical wall flows back centrally of the chamber to said outlet means, means for removing impurities from the tank, a cup-shaped baffle in the separating chamber mounted to rotate with said impeller and located between the outlet means and the impeller, said baffle preventing fluid from flowing directly from the impeller to said outlet means.

References Cited by the Examiner

UNITED STATES PATENTS

| 1,291,857 | 1/1919 | Hankar | 210—512 |
| 1,724,041 | 8/1929 | Plaisted | 55—450 |
| 3,171,807 | 3/1965 | Neuman | 210—512 X |

REUBEN FRIEDMAN, *Primary Examiner.*

J. DE CESARE, *Assistant Examiner.*